Aug. 1, 1961 G. H. VOGT 2,994,797
COLLECTOR LEAD ARRANGEMENT FOR GAS-FILLED GENERATOR
Filed Jan. 21, 1959
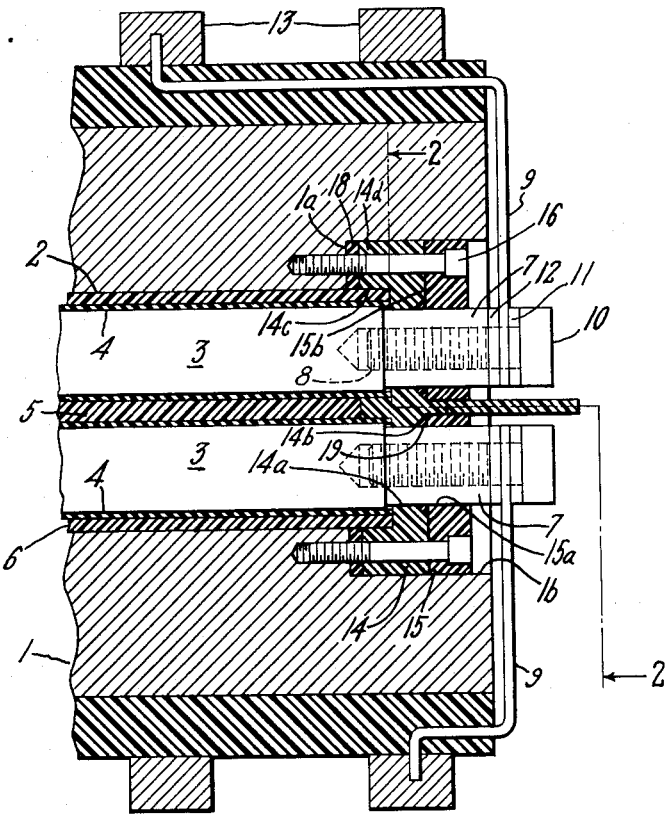
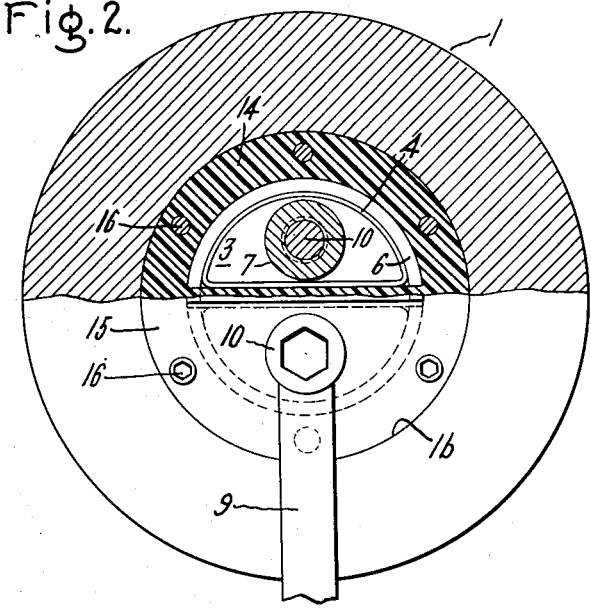
Inventor
George H. Vogt
by Kiess
His Attorney

United States Patent Office 2,994,797
Patented Aug. 1, 1961

2,994,797
COLLECTOR LEAD ARRANGEMENT FOR GAS-FILLED GENERATOR
George H. Vogt, Wakefield, Mass., assignor to General Electric Company, a corporation of New York
Filed Jan. 21, 1959, Ser. No. 788,078
5 Claims. (Cl. 310—232)

This invention relates to a gas-tight insulating arrangement for electrical conductor leads and more particularly it relates to an improved sealing arrangement for the field winding connector bars in the rotor of a gas-cooled generator.

In a generator employing a gas such as hydrogen for cooling the rotor and the stator windings, a gas-tight generator casing forming a seal with the spindle portion of the rotor where it passes through the casing is required to prevent the escape of the cooling gas. In generators having the field windings carried on the rotor, lead-in conductors or "connector bars" passing between the exterior and interior of the gas-filled casing are necessary to carry an "exciting" current to the field windings. These connector bars are usually carried in a hollow spindle portion of the rotor and are supplied with D.C. current by "collector rings" on the spindle.

Inasmuch as the connector bars must pass to the outside of the casing through a passageway cut in the spindle for this purpose, this passageway to the outside is one of the vulnerable places for escape of the gas from the generator. Conventional practice consists in placing a gas sealing arrangement around the conductors inside the generator casing at the point where the field winding leads enter the rotor to be attached to the connector bars. A primary difficulty resulting from this type of construction is that, in the event of leakage of the seal, it is necessary to disassemble a portion of the outer casing in order to gain access to the conductor seal.

Another difficulty of the foregoing construction is that the sealing assembly around the conductor must be located at an accessible point on the rotor itself, and cannot be located directly below the end turns of the field winding, but rather must be moved to a position outboard of the end turns to a relatively clear spot on the rotor.

Accordingly, one object of the present invention is to provide an improved gas-tight conductor seal which is easily accessible for repair.

Another object is to provied a seal for a gas-cooled generator which is located outside the gas-filled casing at the end of the generator rotor spindle.

The invention, in one form, is practiced by providing rigid insulating disk members at the end of the spindle. The connector bars which lie in the hollow interior of the spindle pass through the disks. Gas-tight seals are employed which act in conjunction with the insulating disks to effectively prevent the passage of gas between the shaft and the conductors. The collector ring leads can then be connected to the exterior portions of the conductors which pass through the insulating disks in order to carry the current from the collector rings to the field windings.

The subject matter which I regard as my invention is particularly pointed out and distinctly claimed in the concluding portion of the specification. My invention, both as to organization and method of practice, together with further objects and advantages thereof, may best be understood by reference to the following description taken in conection with the accompanying drawing in which:

FIG. 1 is a fragmental sectional drawing illustrating a rotor spindle end portion utilizing my insulating seal; and FIG. 2 is an end view of the rotor spindle and seal taken along the line 2—2 in FIG. 1.

Referring now to FIG. 1, the spindle end portion 1 of a generator rotor is machined to provide a conduit 2 along the centerline of the spindle which contains insulated copper connection bars, shown generally as 3. The connection bars 3 extend toward the body of the rotor (not shown) along the interior of the rotor spindle and emerge from the spindle through suitable conduits provided inside the gas-filled casing of the generator. The manner of connecting the connection bars 3 to the field windings is not pertinent to an understanding of the present invention.

The two connection bars 3 are each semicircular in cross-section so as to conform to the shape of conduit 2 in the shaft when assembled. This may be seen more clearly by reference to FIG. 2 where the end of a conductor 3 may be seen. Conductors 3 are individually insulated as at 4, and are separated by an insulating spacer 5. This assembly is enclosed in an insulating tube 6 of a suitable molded plastic laminate. Many materials are available on the market for this purpose and one which may be used is sold by the General Electric Company under the trade name of "Textolite."

The terminal ends of connection bars 3 are formed with cylindrical extensions 7, in order to provide a portion which is easily adaptable to sealing. These cylindrical portions 7 are drilled and tapped to provide internal threads 8. A collector lead 9 is secured to the connection bar 3 by means of a bolt 10 passing into the threaded recess of cylindrical portion 7 which is used to secure the collector lead 9 between washers 11 and 12. The collector lead 9 conducts the D.C. exciting current from collector rings 13 which are supported on the spindle 1 and connected to the leads 9 in any suitable conventional manner.

In order to form the gas seal between shaft 1 and the connection bars 3, insulating disk members 14, 15 which are also made here of "Textolite" are disposed in a cylindrical recess 1b in the end of the spindle and have openings 14a, 15a to receive the cylindrical end portions 7. The disks 14, 15 are secured to the shaft by a ring of screws 16 which pass through a series of circumferentially spaced holes in the peripheries of disks 14, 15 and into the radial shoulder 1a machined in spindle 1 for this purpose. An annular gasket 18 of a resilient material, for example a synthetic rubber such as neoprene, is used to provide a seal between disk 14 and spindle 1. Disk 14 is provided with an annular recess 14c into which fits the end of insulating tube 6. Thus the gasket 18, when compressed in an axial direction, will deform radially against the periphery of the insulating tube 6.

In order to form a seal between the disks 14, 15 and the cylindrical portions 7, one edge of the opening 14a in disk 14 is chamfered at 14b in order to accommodate a resilient gasket 19 between cylindrical extension 7, chamfered edge 14b, and the radial surface 15b of disk 15. The constricting of this space squeezes the gasket 19, which is so dimensioned that it completely fills the space when compressed by tightening screws 16 and provides an effective seal to prevent the escape of any gas from the generator traveling through conduit 2 either from between the disks 14 and 15 or between the clearance formed by opening 15a and cylindrical extension 7. Tightening screws 16 also serves to compress gasket 18 between the annular flange 14d and the shoulder 1a, sealing any leakage path which may exist between the outer periphery of disks 14, 15 and the inner periphery of recess 1b.

The very effective insulating and sealing arrangement shown both serves to prevent the escape of gas from the generator by means of the gaskets 18, 19, and also serves to insulate the connection bars electrically from the spindle. Since all of the materials used in forming the seal, with the exception of screws 16, are electrical insulators, the connection bars 3 are effectively insulated from spindle 1. The arrangement shown provides for location of the seal at the outboard end of the rotor spindle thus providing ready accessibility to the seal in the event that any leakage occurs. By using the arrangement shown, it is no longer necessary to disassemble the gas-tight casing of the generator in order to gain access to the sealing assembly.

It will be realized that my improved sealing arrangement is equally applicable to generators having four connection bars leading from the interior of the rotor spindle. In this case, the connection bars would appear as 90° circular segments in cross-section and the cylindrical extensions 7 would be formed from these quarter circles as in the case of the semi-circular cross-sections shown. The insulating disks 15, 16 would naturally incorporate four openings similar to 14a, 15a to receive the cylindrical extensions.

While there has been described what is at present considered to be the preferred embodiment of the invention, it will be understood that various modifications may be made therein, and it is intended to cover in the appended claims all such modifications as fall within the true spirit and scope of this invention.

What I claim as new and desire to secure by Letters Patent of the United States is:

1. A gas-tight insulating seal for electrical conductors comprising a hollow rotor member for a dynamo-electric machine having its interior subjected to gas under pressure, insulated electrical conductor means disposed in said hollow member and having conductor end portions terminating adjacent one end of said member, electrically insulating disk means disposed in the member and having the conductor end portions passing therethrough and terminating shortly therebeyond, first sealing means cooperating with the disk means to prevent the escape of gas between the disk means and the member, and second sealing means cooperating with the disk means to prevent the escape of gas from between the conductor end portions and the disk means.

2. A gas-tight insulating seal assembly for electrical conductors disposed at the end of the rotor spindle of a dynamoelectric machine comprising a hollow spindle portion having its interior subjected to gas under pressure, insulated electrical conductor means disposed in said shaft and having conductor end portions terminating adjacent the end of said spindle, electrically insulating disk means disposed in the spindle and having the conductor end portions passing therethrough and terminating shortly therebeyond, first sealing means cooperating with the disk means to prevent the escape of said pressurized gas from between the disk means and the shaft, second sealing means cooperating with the disk means to prevent the escape of the gas from between the conductor end portion and the disk means, and means securing the disk means to the spindle portion.

3. A gas-tight insulating seal for electrical conductors disposed at the end of the rotor spindle of a dynamo-electric machine comprising a hollow spindle having its interior subjected to gas under pressure and defining a recess at one end thereof, insulated electrical conductor means disposed in said spindle and having cylindrical conductor end portions terminating adjacent the end of said spindle, first and second electrically insulating disk means disposed in said spindle recess and having the cylindrical end portions passing therethrough and terminating shortly therebeyond, first sealing means disposed between said first disk means and the spindle to prevent the escape of said pressurized gas therebetween, and second sealing means disposed between the first and second disk means adjacent the cylindrical end portions to prevent the escape of the gas from between the cylindrical end portion and the first and second disk means, and means securing the disk means to the spindle.

4. A gas-tight insulating seal for electrical conductors disposed at the end of the rotor spindle of a dynamoelectric machine comprising a hollow spindle having its interior subject to gas under pressure and defining a circular recess at one end thereof, first and second insulated electrical conductor means each having semi-circular cross-sections disposed opposite one another in said spindle, and having first and second cylindrical end portions terminating adjacent the end of said spindle, electrically insulating tube means surrounding the first and second conductor means to substantially fill the interior of said hollow spindle, first insulating disk means disposed in said circular recess and having the first and second cylindrical end portions passing therethrough and defining an annular recess to receive the end of said insulating tube means, second insulating disk means disposed adjacent the first disk means and having said first and second cylindrical end portions passing therethrough to terminate shortly therebeyond and defining first and second annular grooves with the first disk means, said first and second annular grooves surrounding the first and second cylindrical end portions respectively, first and second annular sealing means disposed in said first and second annular grooves surrounding the cylindrical end portions, third annular sealing means enclosing the insulating tube and disposed in the circular recess between the first disk means and the spindle, and means to axially compress the first and second disk means with respect to one another and with respect to the spindle.

5. A gas-tight insulating seal for electrical conductors disposed at the end of a rotor spindle of a dynamoelectric machine comprising a hollow spindle having its interior subject to gas under pressure and defining a circular recess at one end thereof, first and second insulated electrical conductor means each having semi-circular cross-sections disposed opposite one another in said spindle, and having first and second cylindrical end portions extending beyond the end of said spindle, electrically insulating tube means surrounding the first and second conductor means to substantially fill the interior of said hollow spindle, first insulating disk means disposed in said circular recess and having the first and second cylindrical end portions passing therethrough and defining an annular recess to receive the end of said insulating tube means, second disk means disposed adjacent the first disk means and having the first and second cylindrical end portions passing therethrough to terminate shortly therebeyond and defining first and second annular grooves with the first disk means, said first and second annular grooves surrounding the first and second cylindrical end portions respectively, first and second annular sealing means disposed in said first and second annular grooves surrounding the cylindrical end portions, third annular sealing means enclosing the insulating tube and disposed in said circular recess between the first disk means and the spindle, a circumferential row of threaded fasteners securing said disks in said circular recess and compressing said first and second sealing means into sealing engagement with the first and second cylindrical end portions respectively and compressing said third sealing means into sealing engagement with said insulating tube means, and means for securing electrical connection leads to the exterior ends of said cylindrical conductor end portions.

References Cited in the file of this patent

UNITED STATES PATENTS

| | | |
|---|---|---|
| 2,311,805 | Yost | Feb. 23, 1943 |
| 2,443,654 | Else et al. | June 22, 1948 |
| 2,750,436 | Richter | June 12, 1956 |